March 8, 1966   C. KOLM ETAL   3,239,678
PIEZOELECTRIC POWER SYSTEM
Filed March 1, 1961

INVENTOR.
CAROL KOLM
PETER H. FOWLER
BY
Blair & Buckles
ATTORNEYS

United States Patent Office 3,239,678
Patented Mar. 8, 1966

3,239,678
PIEZOELECTRIC POWER SYSTEM
Carol Kolm, Bolton, and Peter H. Fowler, Watertown, Mass., assignors, by mesne assignments, to Sonus Corporation, Cambridge, Mass., a corporation of Delaware
Filed Mar. 1, 1961, Ser. No. 92,701
4 Claims. (Cl. 307—43)

This invention relates to a novel electrical power generating system for use in highly vibrational environments. More particularly, it relates to a pizoelectric generator which converts waste acoustical energy from such sources as aircraft jet engines into electrical power suitable for operating lights, motors, electronic apparatus and other power-consuming equipment.

Our invention is directed especially to the generation of electrical power in aircraft. Modern aircraft have an ever increasing electrical power requirement, due in part to the continual addition of electronic apparatus of various types and in part to various facilities such as air conditioning needed for the maintenance of passenger comfort. This has increased the weight of conventional generators beyond desirable limits in view of the dependence of the allowable pay load on the weight of non-paying weight carried by the airplane. Further drawbacks are encountered in operation of the generators in normally non-pressurized portions of the plane, since the low atmospheric pressures at high altitudes increase the problems of arcing and conduction of heat away from the generator windings. Also to be considered is the provision of mechanical input to the generator. Input power is generally in the form of a link coupling the generator to an aircraft engine, with a further increase in non-paying weight.

Accordingly, it is a principal object of our invention to provide an electrical power system adapted for use in aircraft, particularly those powered by jet engines.

Another object of our invention is to provide a power system of the above type which is light in weight.

A further object of our invention is to provide an electrical power system of the above type which offers reliable operation at high altitudes and in environments having high acoustical and vibrational intensity.

Other objects of the invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

Figure 1:
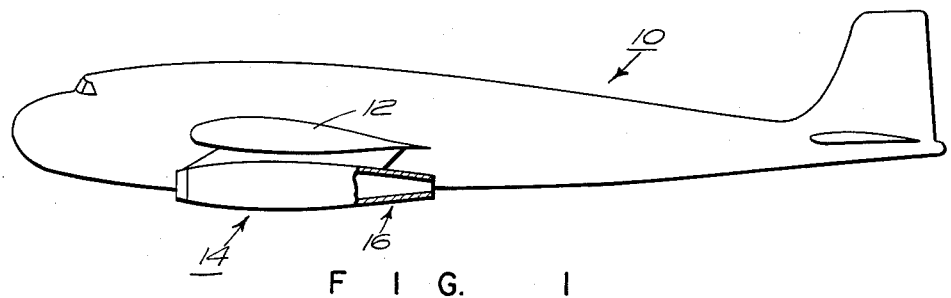
Figure 2:
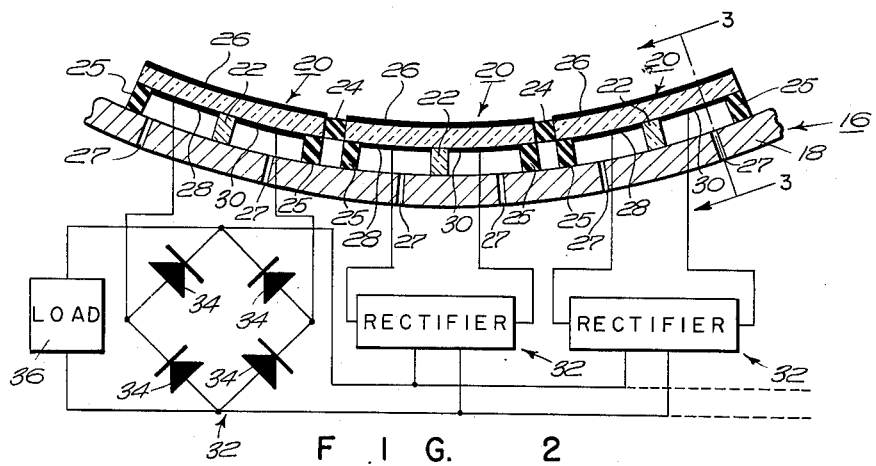
Figure 4:
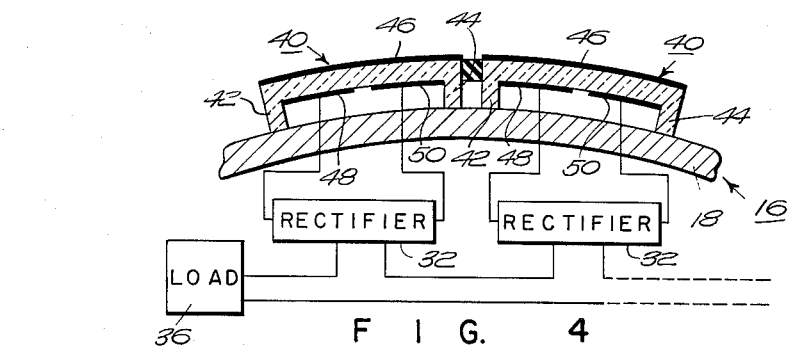
Figure 3:
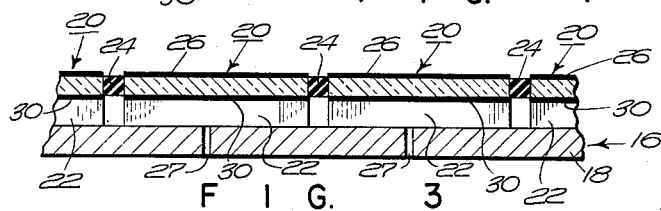

For a fuller understanding of the nature and objects of the invention, reference should be had to the following detailed description taken in connection with the accompanying drawings, in which:

FIGURE 1 is a side elevation, partly broken away, of a jet airplane using a generating system embodying my invention, FIGURE 2 is a fragmentary view, partly in section, showing in detail an arrangement of the transducers used in the generator, and illustrating schematically the electric circuit incorporated therein, FIGURE 3 is a view taken along line 3—3 of FIGURE 2, and FIGURE 4 is a fragmentary view of our generator, showing another mounting arrangement for the transducers used therein.

In general, our electric system uses piezoelectric transducers which convert some of the acoustical energy in the exhaust of a jet engine into usable electric power. It is well known that an enormous amount of waste acoustical power is generated by jet engines. In fact, this power, which is largely in the form of audible noise, has been such a problem in operation in urban areas that considerable sums of money have been expended in attempts to suppress or dissipate it. We have made use of part of this waste power by exposing piezoelectric transducers to it in such manner that the transducers generate electric power sufficient for the various electric loads in the airplane.

Referring now to FIGURE 1, an airplane generally indicated at 10 has a wing 12 from which is suspended a jet engine generally indicated at 14. The engine 14 has an exhaust pipe generally indicated at 16, which is a composite piezoelectric transducer converting acoustical energy in the exhaust stream of the engine into electrical power used within the airplane 10.

More specifically, as seen in FIGURES 2 and 3, the exhaust pipe 16 includes a metallic housing 18 lined with a plurality of piezoelectric transducers generally indicated at 20. The transducers 20 are preferably of polarized ceramic material such as barium titanate, lead titanate-lead zirconate, lead metaniobate, etc. They are supported on the housing 18 by elongated beams 22, shown in transverse section in FIGURE 2. The beams, which are preferably of ceramic material integral with the transducers 20, are bonded to the housing 18 by a suitable cement. Assuming that the transducers 20 are on the inner surface of the housing 18 and thus exposed directly to the acoustical pressures within the exhaust pipe 16 (FIGURE 1), the spaces between adjacent transducers are filled with seals in the form of resilient strips 24 of material such as silicon rubber, capable of withstanding the temperatures encountered by them. Edge supports 25, also of resilient material, add structural stability to the generator. The spaces between the transducers and the housing 18 may be vented to the atmosphere by holes 27.

Still referring to FIGURES 2 and 3, each of the transducers 20 has an electrode 26 covering its upper surface and a pair of electrodes 28 and 30 on the opposite surface on either side of the beam 22. The electrodes 28 and 30 are connected to the inputs of bridge rectifiers generally indicated at 32. The rectifiers 32, which include diodes 34 connected in a conventional arrangement, have output terminals connected in parallel with each other and to a load 36. The load 36 represents the various power consuming devices in the airplane 10, such as electronic equipment, lights, etc.

Preferably, each of the transducers 20 is polarized in the thickness direction, i.e., perpendicular to the electrodes 26, 28 and 30, and the polarization on one side of the beam 22 is in the opposite direction to that on the other side of the beam. The transducers may be coated with a suitable insulating material to protect them from moisture and other environmental factors.

The exhaust stream of the jet engine 14 carries a large amount of acoustical energy which, along the inner surface of the exhaust pipe 16, is in the form of pressure waves that flex the transducers 20 to provide an electrical output therefrom. More specifically, the pressure variations cause the transducers 20 to bend about the stiff beams 22 and alternately compress and expand the resilient edge supports 25. Assuming that the portions of each transducer on opposite sides of the beam 22 bend in the same direction, the voltages developed between the electrodes 28 and 30 and the electrode 26 will be of opposite polarity. With the configuration shown, the two portions of each transducer are in series, so that these voltages add. This arrangement provides twice the output voltages which would be available with a single electrode on the inner side of the transducer, and polarization in both portions of the transducer in the same direction.

The output power from the transducers 20 may be maximized by making them mechanically resonant at the dominant acoustical frequencies within the exhaust pipe 16. However, the pass band of the transducers should be made broad, in accordance with conventional techniques, since the dominant frequencies vary according to airplane speed and engine r.p.m. The pass band may be defined as the range of frequencies over which a transducer converts a significant portion of the incident acoustical energy into electrical energy. The limits of the band are generally taken as the frequencies at which the output power is 3 db below the power at mechanical resonance of the transducer. In this connection it will be noted that the compliance of the strips 24 and supports 25 should be substantially less than that of the transducers 20, so as to have minimal effect on the frequency response of the transducers.

The reason for the use of a plurality of transducers 20 stems from the fact that generally the effective wavelength of much of the acoustical energy within the exhaust pipe 16 is materially less than the characteristic dimensions of the pipe. Accordingly, a transducer extending a substantial distance in any direction within the pipe will, at the higher frequencies, be subjected to both inward and outward bending at various points along its surface. The net effect will be to cancel much of the incident energy, with a consequent reduction in output. With the use of a plurality of transducers, each of whose dimensions are substantially less than the effective wavelength at the highest frequency within the transducer pass band at which there is a substantial acoustical energy density. We have eliminated the problem of energy cancellation.

It should be noted that a number of the transducers 20 may be formed from a single piece of ceramic material, with elimination of the supports 25, as well as the strips 24 between the individual transducers. However, we prefer to use separate transducer units, since this permits a greater degree of flexing and a resulting higher output voltage.

In FIGURE 4 we have fragmentarily illustrated another embodiment of our invention in which the generator includes a plurality of transducers generally indicated at 40, stiffly supported along parallel edges rather than in the center. Thus, each transducer 40 is supported on beams 42 and 44, preferably formed in the same manner as the beams 22 of FIGURE 2 and bonded to the housing 18 of the exhaust pipe 16. Each transducer has a single electrode 46 on one face and a pair of electrodes 48 and 50 on the opposite face.

The polarization arrangement is thus the same as in the transducers 20 of FIGURE 2, with the electrodes 48 and 50 connected to the inputs of rectifiers 32. However, in this case, we have shown the outputs of the rectifiers connected in series instead of in parallel, so that their output voltages are added. In practice, the generator actually has a series-parallel arrangement so as to provide the required voltage, which is generally substantially higher than the output voltage of a single rectifier 32, as well as a load current which is in excess of the capability of an individual transducer.

Still referring to FIGURE 4, the transducers 40 are mounted on the external surface of the housing 18. Thus, instead of being exposed directly to the gases within the exhaust pipe 16, they receive acoustical energy transmitted through the housing. The flexure of the housing in response to the pressure variations on its inner surface is coupled to the transducers 40 through the beams 42, and again the transducers bend about their center lines to operate in the manner described above.

It will be noted that, because of the exterior mounting of the transducers 40, the sealing arrangement of FIGURE 2 is not required. Furthermore, the transducers 40 are not exposed to the high temperatures and erosive gases to which the transducers 20 are subjected. On the other hand, there is some loss in acoustical intensity as a result of transmission through the housing 18, and, therefore, the mounting position of the transducers, i.e., inside or outside the housing, will depend on such factors as exhaust gas temperature and velocity, as well as housing thickness.

It will be apparent that the method of support of the transducers 20 and 40 of FIGURES 2 and 4 may be interchanged. That is, the transducers 20 may be supported at the outer edges thereof and the transducers 40 along the middle. Also, other modes of operation may be used. For example, the transducers might be bonded directly to the housing 18 so as to operate in a thickness mode, with the acoustical pressures alternately compressing and expanding them. However, we prefer to use a bending mode because of the greater output voltage ordinarily obtainable thereby.

Prior to our invention, it was generally believed that, in order to maximize the electrical output of a piezoelectric transducer, the output impedance of the transducer should be matched to the impedance of the load connected thereto. However, we have found that this is not the case, and, in fact, the electrical impedance of the transducer should be substantially greater than that of the load, at least twice, and preferably ten times as great. In fact, it may go as high as practicable, considering the effect on the dimensions of the transducer. The reason for this is that the charge developed between opposing electrodes of a transducer is independent of the capacity between the electrodes. On the other hand, the voltage corresponding to this charge increases as the capacitance decreases, i.e., as the electrical output impedance of the transducer increases. With a higher voltage, a greater load current may be obtained with a given load impedance, and, therefore, the power output of the transducer is greater.

From another viewpoint, the voltage must be high enough to substantially discharge the output capacitance of the transducer through the load before the charge on the capacitance is neutralized by a reversal of transducer motion. As the vibrational frequency increases, a decrease in capacitance—with the charge remaining constant—accomplishes this objective. The output impedance of the transducer is roughly equal to the reactance of the interelectrode capacitance ($1/c$) and, therefore, it follows that the impedance should be high compared to the load impedance at the frequencies at which the transducer is to convert substantial vibrational power into electrical power.

There are, of course, limitations in the amount by which the efficiency of the generator may be optimized in this manner. In the first place, inherent characteristics of the transducers limit the output power when the electrical impedance reaches a certain maximum point relative to the load impedance. Also, the capacitance is most easily reduced by thickening the transducer, and this reduces its ability to flex in the constructions described above. Thus, the improvement in electrical characteristics is offset in part by a decrease in the mechanical input to the transducer, and, above a certain point, there may be no net advantage in adding to the transducer thickness.

In each of the transducers 20, the interelectrode capacitance referred to above is the capacitance between the electrodes 28 and 30 by way of the electrode 26. Thus, the transducer is, in effect, similar to a unit in which the portions on opposite sides of the beam 22 have been folded over face-to-face about the electrode 26, except that the stiffness is much less in the illustrated construction. It will be apparent that this principle can be extended by staggering a series of electrodes on opposite sides of a transducer, with polarization reversed from one pair of opposing electrodes to the next.

Among the important advantages of our invention is the fact that operation is relatively independent from atmosphere conditions, particularly pressure. The transducers themselves are not a source of heat generation, and, therefore, in general, they need not be cooled. There are no commutators or slip rings of the type used in generators and alternators, and, therefore, in general, they need not be cooled. There are no commutators or slip rings of the type used in generators and alternators, and, therefore, there are no arcing or corona problems. Reliability is further enhanced by the absence of moving parts. Furthermore, should a single transducer or the rectifier associated therewith fail, effect on the operation of the entire generator will be negligible. The generator is light in weight, a desirable feature in aircraft equipment, as pointed out above. Its use is particularly desirable in craft powered by ram-jet engines, which do not have rotating shafts or other suitable mechanical power sources.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A power system for an aircraft having a jet engine, said power system comprising, in combination, an exhaust pipe on said jet engine, said pipe including a piezoelectric transducer, means mounting said transducer for flexural vibration in response to the acoustical energy within said exhaust pipe, whereby a pair of opposing surfaces of said transducer bow about an axis during said flexure, said transducer having an electrode on one of said surfaces and a pair of electrodes on the other of said surfaces on opposite sides of said axis and a rectifier connected to said transducer for rectifying the voltage between said pair of electrodes.

2. An electrical power system for an aircraft having a jet engine, said system comprising, in combination, a plurality of piezoelectric transducers mounted for independent vibration in response to acoustical energy generated by said engine, each of said transducers being in the form of a plate mounted for flexure about an axis, said plate having an electrode on one face thereof and a pair of electrodes on the opposite face thereof on opposite sides of said axis, a separate rectifier connected to each of said transducers said rectifier being connected to rectify the voltage between said pair of electrodes, a load and means connecting the outputs of said rectifiers to said load.

3. The combination defined in claim 2 including a stiff member extending substantially along a center line of each of said transducers and supporting the transducer on said housing.

4. The combination defined in claim 2 including a pair of stiff members parallel to said axis of each of said transducers and supporting the transducer on said housing.

References Cited by the Examiner
UNITED STATES PATENTS

| | | | |
|---|---|---|---|
| 2,361,071 | 10/1944 | Vang | 180—1 |
| 2,522,389 | 9/1950 | Mason | 310—8.1 |
| 2,539,535 | 1/1951 | Espenschied | 310—8.1 X |
| 2,638,556 | 5/1953 | Hansz | 310—8.4 |
| 2,659,829 | 11/1953 | Baerwald | 310—8.1 |
| 2,676,273 | 4/1954 | Oestreicha | 307—150 |
| 2,808,522 | 10/1957 | Dranetz | 310—8.4 |
| 3,058,015 | 10/1962 | Nesh | 310—8.7 |

LLOYD McCOLLUM, *Primary Examiner.*

MILTON O. HIRSHFIELD, *Examiner.*